UNITED STATES PATENT OFFICE.

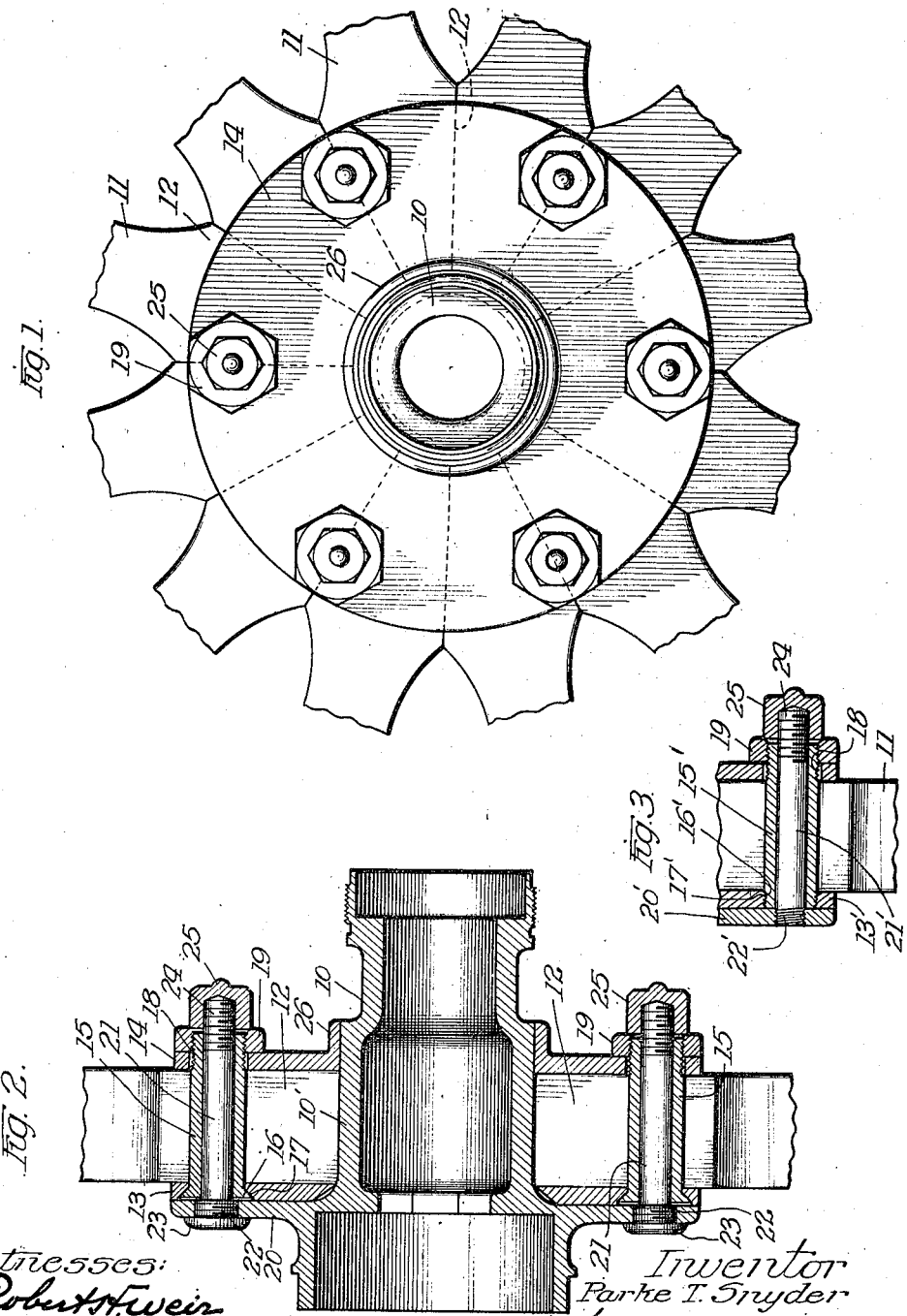

PARKE T. SNYDER, OF CHICAGO, ILLINOIS.

DEMOUNTABLE WHEEL.

1,243,773.  Specification of Letters Patent.  Patented Oct. 23, 1917.

Application filed September 28, 1916. Serial No. 122,618.

*To all whom it may concern:*

Be it known that I, PARKE T. SNYDER, a citizen of the United States, residing at Chicago, in the county of Cook and State of Illinois, have invented certain new and useful Improvements in Demountable-Wheels, of which the following is a specification.

This invention relates to improvements in vehicle wheels and more particularly to a demountable wheel for motor cars.

One of the great difficulties encountered in motoring is the delay and annoyance caused by injury to the pneumatic tires, resulting from punctures or blow-outs. Before the advent of the demountable rim and demountable wheel, it was necessary for the motorist, in the event of a puncture or blow-out, to remove the casing from the rim and replace or repair the inner tube, a most difficult and time consuming operation, when remote from a garage where the proper tools may be obtained and where air is usually stored under pressure for inflating the tire.

Since the introduction of the now, well known demountable rims and demountable wheels, the above referred to annoyance has been eliminated, motorists carrying with them a spare tire, already inflated, in the first instance on a detachable rim and in the second instance on a detachable wheel, which may be used to replace the injured tire.

One of the objects of my invention is to provide a demountable wheel which may be removed and replaced by a spare wheel carrying an inflated tire in a minimum amount of time, without difficulty or annoyance.

Another object of the invention is to provide a demountable wheel of sturdy and rigid construction which will not get out of alinement or loose in its spoke joints.

Another object of my invention is to provide such a wheel which may be readily attached to Ford automobiles, combining efficiency and great strength, with low manufacturing cost.

Still other and further objects will become readily apparent to those skilled in the art from a consideration of the following specification and drawing, wherein:—

Figure 1 is a fragmentary side elevation of my improved demountable wheel showing the hub construction.

Fig. 2 is a vertical sectional view through the center of my improved hub, and;

Fig. 3 is a fragmentary sectional view through a modified bolt construction.

Referring to the drawings, wherein I have illustrated a preferred embodiment of my invention, the numeral 10 indicates a vehicle hub, within which the usual annular bearings are carried. The spokes of my improved wheel may be joined by any of the well known methods, the form illustrated comprising a plurality of spokes 11, the inner ends 12, of which are beveled to coact and form a complete disk, the inner and outer faces of which are overlain by annular metal plates 13, 14.

The plates and wheel hub are bored at spaced apart intervals to receive tubular bushings 15, the inner ends of the bushings 15 being flanged over, as at 16, to lie within the countersunk openings 17 in the inner plate. The outer ends of the bushings 15 are screw threaded, as at 18, for engagement by nuts 19, which clamp the tubes in place, thus securely fastening together the two plates with the interpositioned spokes. The structure thus far described, therefore, results in a sturdy strong spoke construction, which will not readily get out of alinement and which cannot become injured or warped when removed from the wheel hub.

Extending from near the inner end of the hub 10 is an annular plate or flange 20, against which the inner plate 13 of the demountable wheel abuts. Projecting outwardly from the plate 20 are a series of studs 21, in screw threaded engagement, as at 22, with the plate 20, the inner ends being provided with heads 23, and the outer ends threaded, as at 24. The studs 21 are of a diameter such as to make a comparatively tight fit with the interior diameter of the bushings 15 and cap nuts 25 are screw threaded on the outer ends of the studs 21 to clamp the wheel in place.

The hub 10 is provided with a flat shoulder 10' of an axial width sufficient to provide ample bearing for the demountable wheel and the outer plate 14 is flanged outwardly at its center 26 to provide additional bearing upon the shoulder 10'.

A modified form of this construction is shown in Fig. 3, in which the tubular bushing 15' is screw threaded at its inner end 16' for engagement with the threaded opening 17' in the inner plate 13'. The outer end of the bushing 15' is screw threaded, as at 18, as in the first described embodiment of the invention and a nut 19 in engagement with the screw threads 18 clamps the two plates and spokes in rigid relationship. In this modified form the stud 21' is reduced in diameter and screw threaded at 22, for engagement with the screw threaded opening in the plate 20' and a cap nut 25 makes engagement with the threaded end 24, as in the first described construction.

From the above it is obvious that I have provided a demountable wheel in which the spokes are rigidly secured in position by a pair of plates on opposite sides by means of tubular bushings which clamp the two plates together and the wheel is secured to the hub by means of studs carried by the hub and arranged for insertion within the openings in the tubular bushings. In this manner I have been able to reduce the number of fastening bolts to a minimum, say 6, for example, as illustrated in the embodiment shown in the drawings and the same number of holes are made through the spokes, since these holes serve not only to receive the spoke clamping members, but also the wheel clamping members.

Whereas I have illustrated and described a preferred embodiment with a single modification thereof, it will be obvious to those skilled in the art that various modifications and changes may be made therein without departing from the spirit of the invention or the scope of the appended claim.

Having described my invention, what I claim is:

A demountable wheel for attachment to vehicle hubs comprising a plurality of spokes the inner ends of which meet to form a solid disk, annular plates positioned on each side of the inner ends of the spokes, tubes extending through openings in the plates and spokes, one end being formed for engagement with one plate and the other end being threaded, nuts on the threaded ends of the tubes for clamping the plates and spokes in rigid relationship, studs carried by the hub and arranged for insertion through the tubes, and nuts for engagement with the outer ends of the studs for clamping the wheel to the hub.

In testimony whereof I hereunto set my hand in the presence of two subscribing witnesses.

PARKE T. SNYDER.

In the presence of—
  STANLEY W. COOK,
  MARY F. ALLEN.